United States Patent [19]

Hooke et al.

[11] Patent Number: 5,686,202
[45] Date of Patent: Nov. 11, 1997

[54] STRESS RESISTANT BATTERY CONFIGURATION

[75] Inventors: John W. Hooke, Warrensburg; Greg G. Green, Oak Grove; Mary Jo F. Washeck, Warrensburg, all of Mo.

[73] Assignee: Hawker Energy Products, Inc., Warrensburg, Mo.

[21] Appl. No.: 544,622

[22] Filed: Oct. 18, 1995

[51] Int. Cl.$^6$ ..................................................... H01M 2/04
[52] U.S. Cl. ........................ 429/160; 429/115; 429/176; 429/185; 29/623.2
[58] Field of Search ................................ 429/160, 163, 429/175, 176, 185, 179; 29/623.1, 623.2

[56] References Cited

U.S. PATENT DOCUMENTS

| | | |
|---|---|---|
| 4,374,187 | 2/1983 | Sano . |
| 4,423,123 | 12/1983 | Okamatsu ........................... 429/160 |
| 4,444,853 | 4/1984 | Halsall et al. . |
| 4,675,991 | 6/1987 | Byerz ................................ 29/623.1 |
| 4,724,190 | 2/1988 | Siga et al. ......................... 429/160 X |
| 4,808,495 | 2/1989 | Goldstein . |
| 5,182,178 | 1/1993 | Brizendine et al. .................... 429/160 |
| 5,296,317 | 3/1994 | Ratte et al. . |
| 5,389,465 | 2/1995 | Hooke ................................ 429/185 X |
| 5,445,907 | 8/1995 | Ito et al. . |

*Primary Examiner*—Anthony Skapars
*Attorney, Agent, or Firm*—Lorusso & Loud

[57] ABSTRACT

A novel apparatus and method for constructing a stress resistant battery which allows the use low modulus materials through end wall rib reinforcements and a cover having a plurality of integral bosses which vertically project and connect to cast on straps. A plurality of baffles adapted to snap fit into the inner bottom portion of the cover and augment stress resistance through rigid contact against the battery plates. A plurality of cast on straps welded back to back in pairs through each of said electrochemical cell walls each having a seating boss so as to connect with each of the cover bosses.

The battery of the present invention also includes means of affixing terminal connectors in a scalloped configuration thereby preventing over-torquing and failure of the cover during electrical-mechanical connection.

9 Claims, 21 Drawing Sheets

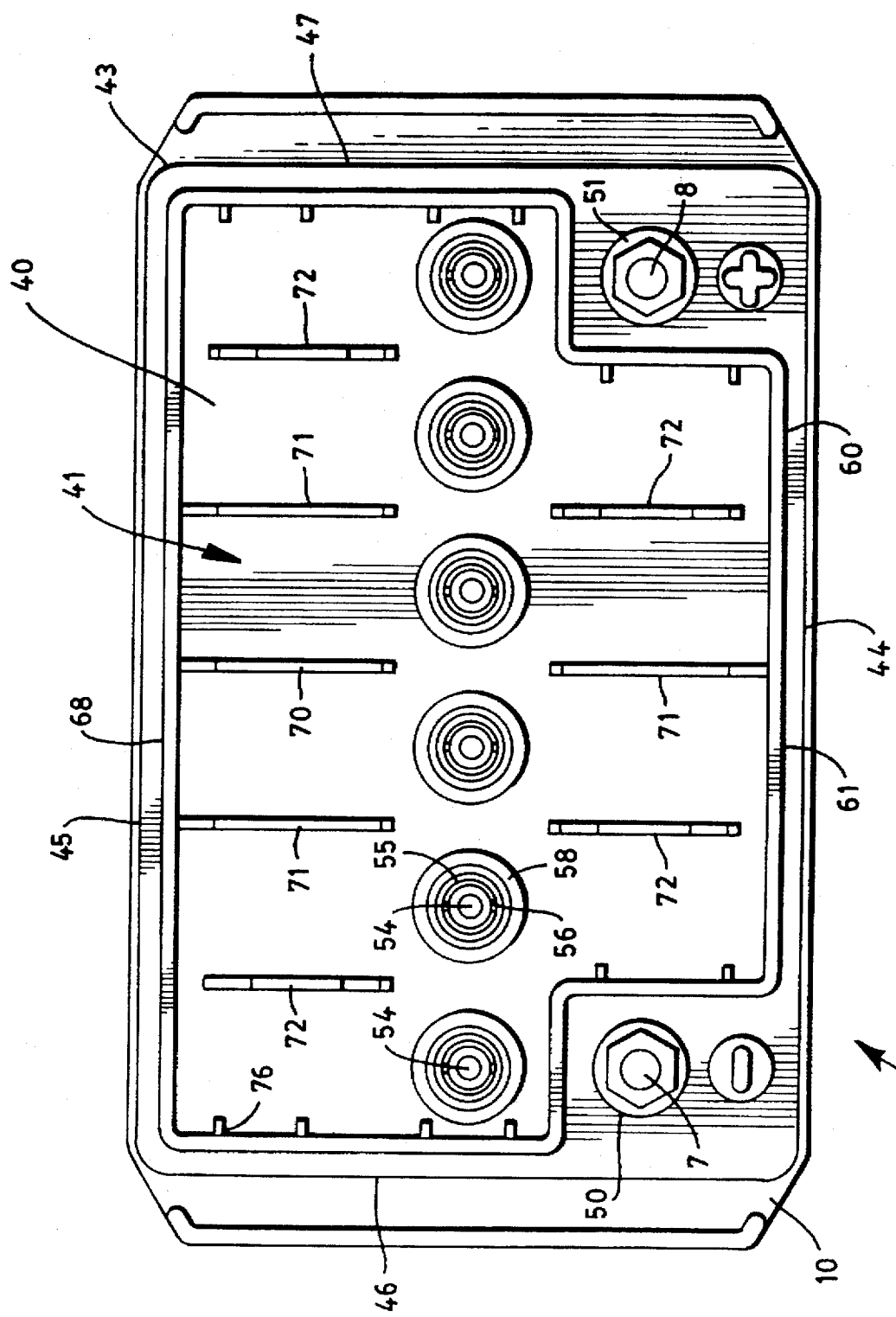

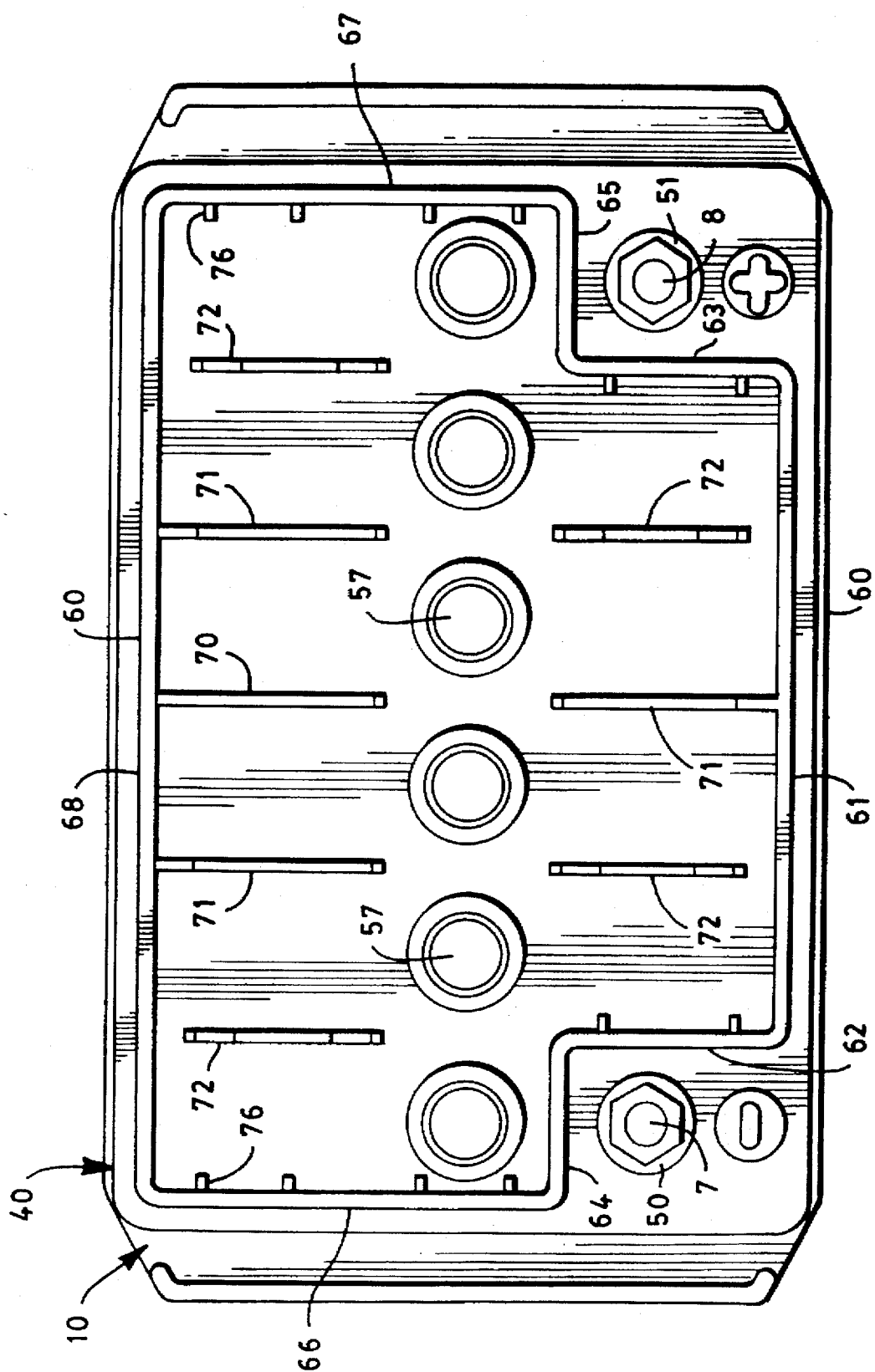

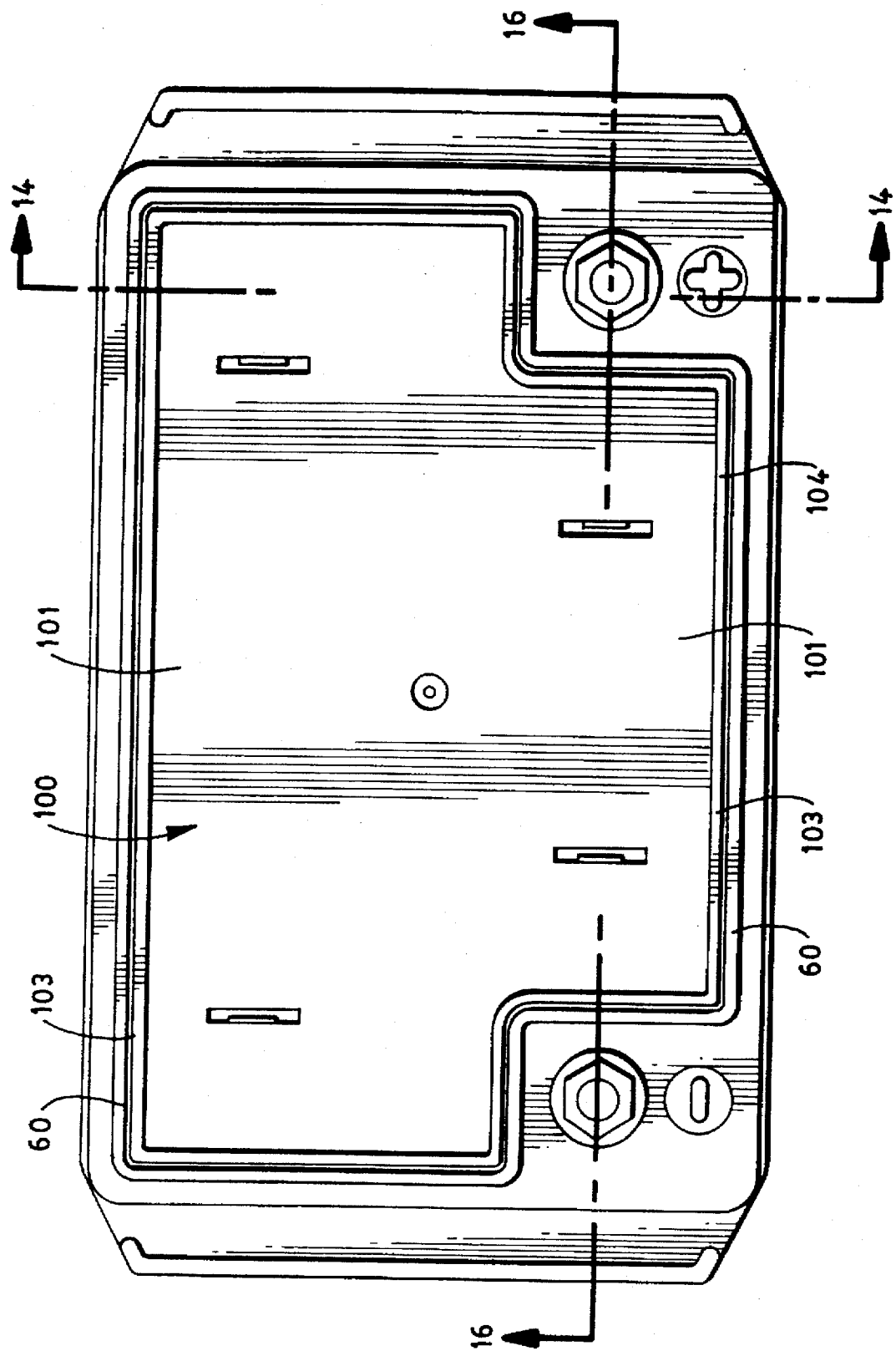

STRESS RESISTANT BATTERY CONFIGURATION

FIELD OF THE INVENTION

The field of this invention relates to electrochemical cells and batteries, and in particular, batteries for use in applications where resistance to vibration and mechanical stress is improved without increasing battery size or weight and without degrading battery performance. More specifically, the field of the invention is power modules intended for use in providing power for motorcycles, jet skies and other small recreational vehicles.

BACKGROUND OF THE INVENTION

It is the primary function of electrochemical cells, lead acid batteries and sealed batteries to convert chemical energy into electrical energy. One measure of battery performance is the amount of electrical energy produced for a given size and weight battery. Typically, batteries of the prior art achieve high performance characteristics with a concomitant increase in size and weight. In the automotive industry, for example, twelve volt direct current batteries for automobile applications typically produce peak currents of 700 Amperes for brief durations of time but weigh on the order of 60 lbs. Of course, a battery with a weight in the order of 60 lbs. is not a suitable battery for use on a recreational vehicle such as a jet ski.

Some of the important parameters of lead acid and other sealed batteries include, cold cranking voltage and the amount of amperage that can be delivered under load conditions. Typically, automotive batteries can output, albeit for brief durations of time, 12 Volts at 200 Amperes at below freezing temperatures. However, performance characteristics of batteries are normally achieved at the expense of size and weight.

In the automotive and other related recreational fields, resistance to mechanical stresses from thrust loads and vibrations is an important factor in determining battery performance. Maintaining the structural integrity of the battery, internally and externally, insures that the electrochemical components of opposite polarity do not come into contact and create a short circuit, or that the battery electrolyte does not leak through a stress crack, resulting in drastic decreases in battery performance and battery failure. Further, stress and vibration can cause an open circuit also resulting in battery failure. Resistance to residual stress is especially critical for batteries made out of solvent resistant plastics, such as polypropylene, and other low modulus materials. Not all mechanical stresses are caused by the environment. Another cause of stress cracks is the overtightening of terminals during electromechanical connection between the battery and load.

Significant effort has been expanded in order to reduce the overall size and weight of a battery without sacrificing its performance characteristics. One such attempt involves the alloying of lead materials to provide an alloy lead plate which is stiffer and thicker than was conventional. Traditional approaches to improve the shock and vibration resistance of lead acid batteries include alloying of the lead to improve the modulus thereby improving its stiffness, and manufacturing the plates with a significant thickness to improve the stiffness of the attachment points from plates to plates within the battery.

Battery designs have improved resistance to mechanical stress by employing longitudinal reinforcement ribs integral with the battery casing. However to date, batteries and in particular batteries made out of polypropylene and other solvent resistant plastics are prone to cracking particularly when subjected to high vibrational forces and/or cold temperatures.

SUMMARY OF THE INVENTION

The present invention achieves relatively high performance characteristics in a small casing with a novel battery reinforcement design which not only allows relatively inexpensive and solvent resistance materials to be used in its construction, but allows the packaging of a relatively greater number of positive and negative plates per electrochemical cell. The large density of plates improves output voltages and currents, and provides longer periods of peak voltage delivery to a load in comparison to other batteries of equal size and weight.

The battery of the present invention is a structural design accomplished by essentially two components, the case and the cover assembly. The case is designed with reinforcing ribs on both endwalls that run parallel to the plates. The reinforcement ribs which extend perpendicularly from the surface of both endwalls provide substantial projections therefrom on the order of half inch or greater. Cell separators molded integrally with the case itself provide further support for the case and separate the battery into its component cells.

The cover assembly has three rows of projections which function not only to provide rigidity to the positive and negative plate groups but also provide a biasing means to bias against the plates themselves and prevent the plates from vibrating.

It is an advantage of the present invention that each terminal connection for the stress resistant configuration battery case is designed to prevent the over-torquing of the terminal retaining nuts and/or damage to the battery cover. This accomplished by the combination of a novel battery cover assembly and head bolt design in which the positive and negative terminal bores are matched to the configuration of the positive and negative terminal bolts. The terminal bores and terminal bolts fit like two pieces of a puzzle that lock together. It is a feature of the present invention that the positive and negative terminal bolts have a multilobed cap or such a geometric configuration that torque or turning forces are evenly distributed within the cover assembly thereby minimizing internal stress loads.

It is an advantage of the present invention that the cover assembly has a plurality of baffles that snap fit into the cover assembly and form an interference fit with plate groups of each electrochemical cell.

It is another feature of the present invention that cast-on-straps which are used to electrically connect the plate groups, have specially designed seating bosses.

It is another feature of the present invention that each terminal bolt has a cast on piece so that it functions as a special cast-on-strap, a terminal cast-on-strap.

It is another feature of the present invention that the positive and negative terminal cast-on-straps connect the lead out positive plate group and lead in negative plate group to a load.

It is another feature of the present invention that cylindrical projections, comprising cover bosses, bias down on cast-on-straps.

It is another feature of the present invention that cylindrical projections, comprising terminal bosses, bias down on terminal cast-on-straps.

It is feature of the present invention that the cover assembly has projections which press down on the plate groups of each electrochemical cell. It is an advantage of the present invention that this bias provides rigidity to each plate group of each electrochemical cell thereby preventing the plates from vibrating and making contact or breaking apart.

It is an objective of the present invention to construct a battery small in size and light in weight while being capable of delivering large amounts of amperage under load.

It is another objective of the present invention to construct a battery made out of polypropylene that is highly stress resistant to vibration and other mechanical shocks.

It is another object of the present invention to construct a battery that is small yet capable of delivering a relatively high cold cranking voltage.

It is another object of the present invention to construct a battery casing with at least one reinforcement support.

It is another object of the present invention to construct a battery casing with at least one internal projecting boss.

It is another object of the present invention that the internal projecting boss be softened and allowed to cool around a seating boss of a cast-on-strap so as to form an interference fit with the cast-on-strap, and thereby add structural rigidity to the plate group.

It is another object of the present invention to construct a battery having terminal bores configurations each of which is matched to the configuration of a terminal post having a gasket and retainer.

It is another object of the present invention to construct a battery having terminals connects that are hydrostatically sealed by means of uniformly compressing a gasket in a closed configuration determined by the shape of the terminal bore, the head bolt portion of the terminal post and the retainer.

It is another object of the present invention to construct a battery having terminals that are hydrostatically sealed by means of tightening a retaining nut.

BRIEF DESCRIPTION OF THE DRAWING

FIG. 7A is a top plan view of a battery casing primarily illustrating the cover assembly in accordance with the present invention.

FIG. 7B is a top plan view of a battery casing primarily illustrating the cover assembly with its valves in place in each cylinder bore in accordance with the present invention.

FIG. 7C is a top plan view of an assembled battery primarily illustrating the snap fit valve cover in accordance with the present invention.

DESCRIPTION OF THE PREFERRED EMBODIMENT

At the outset, a battery is described in its broadest overall aspects with a more detailed description following. It will be understood that the present invention is applicable to various types and configurations of batteries.

Figure 1:
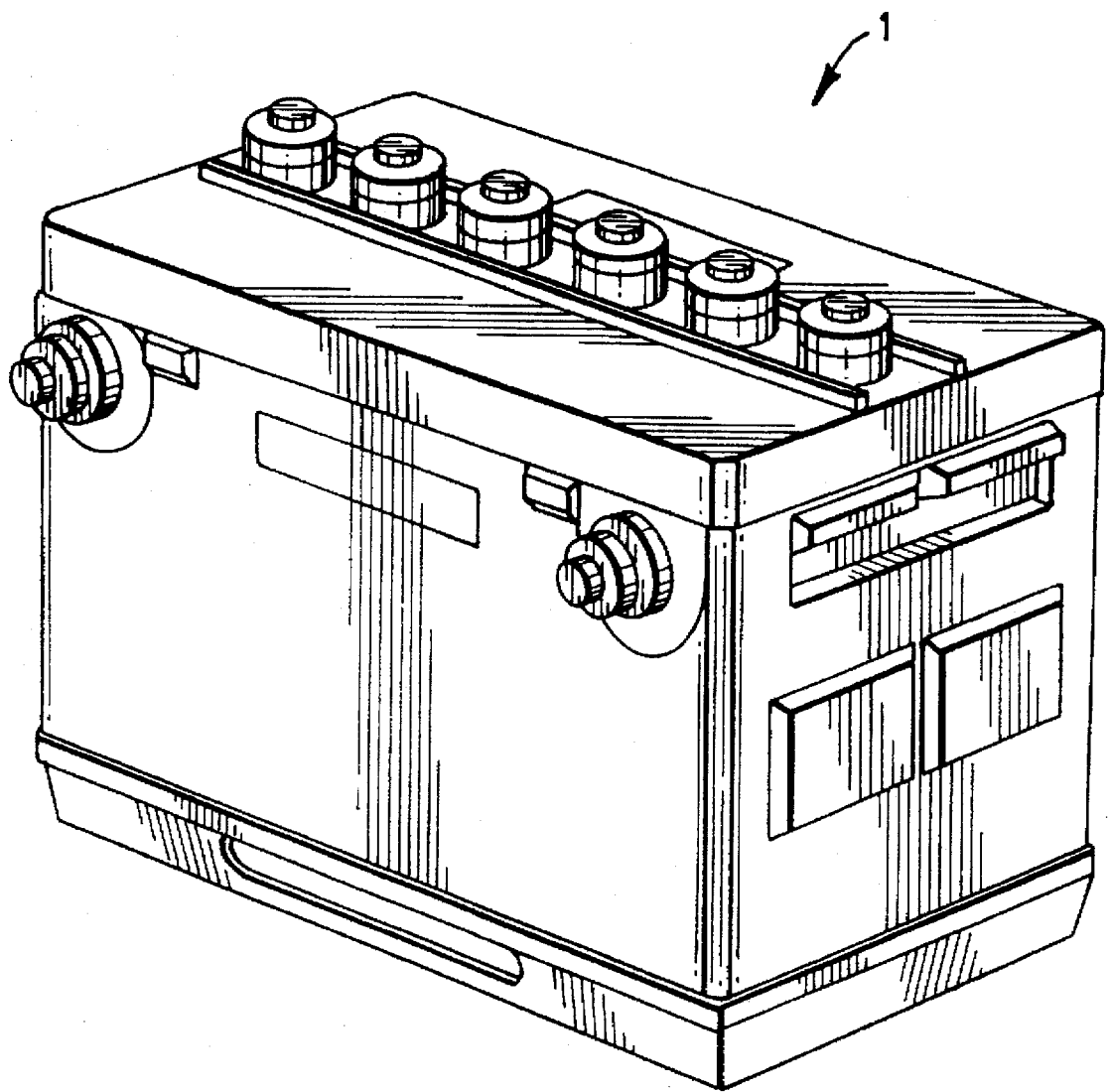
FIG. 1 is a perspective view of a prior art battery cover and casing.

FIG. 1 illustrates generally a battery 1 of the prior art. Battery construction and composition is described in the text "Auto Mechanics Fundamentals" by Stockel and Stockel, the teachings of which are hereby incorporated by reference. Typically, prior art batteries have had limited structural reinforcements designed into the battery casing and have relied on the intercompartmental walls which function to separate the cells to provide structural rigidity as well. In keeping with this design approach, battery covers of the prior art were designed primarily to seal the electrolytic chemicals in each electrochemical cell of the battery.

Figure 2:
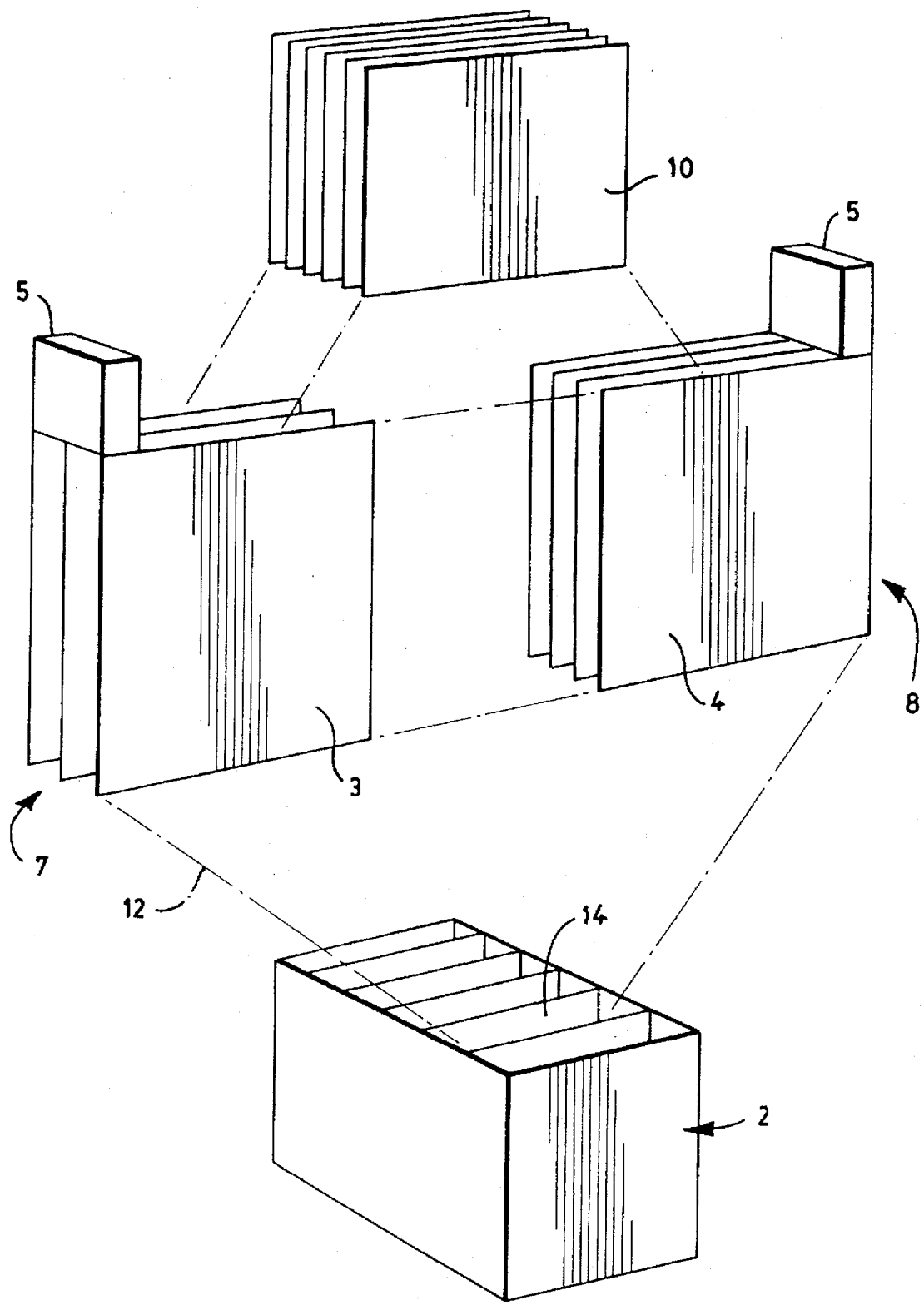
FIG. 2 is a perspective diagram of negative and positive plate groups for an electrochemical cell in accordance with the prior art.

FIG. 2. diagrammatically shows a bottom casing 2 for a twelve volt battery of the prior art is divided into six compartments or cells into each of which are placed several positive and negative plate grids generally indicated by 3 and 4, respectively. Typically, battery plate grids are comprised of wire-like, skeletal frameworks manufactured out of lead and antimony or of lead and calcium that are filled with lead peroxide, "spongy lead." The "spongy lead" or lead in sponge form allows the battery electrolyte, typically a water and sulfuric acid mix, to penetrate the positive plates. Negative plate grids are filled with porous lead plus expanders to prevent the lead from reverting back to its inactive state.

FIG. 2 further illustrates generally how several positive plate grids 3 welded to common connector 5 form a positive group 7. And similarly, an equal amount of negative plates plus one additional negative plate, generally indicated by 4, are welded to another common connector 5 to form a negative group 8. In the manufacture of a battery, the positive group 7 and the negative group 8 are spatially interleaved with porous separators 10 interposed between plates of opposite polarity to prevent short circuiting. Phantom lines 12 show how the combination of positive group 7 and negative group 8 into a single compartment 14 forms the basis of 2 volt electrochemical cell. As known in the art, adding more plates or increasing the area of the plates serves to increase the amount of current that can be supplied to a load. As known in the art, the voltage potential of a battery cell is a function of the chemical redox reactions which convert chemical energy into electrical energy. Typically, five pairs of common connectors typically made out of lead, and two terminal connectors (not shown), are used to electrically connect six 2 volt electrochemical cells in series to form a twelve volt battery.

Figure 3:
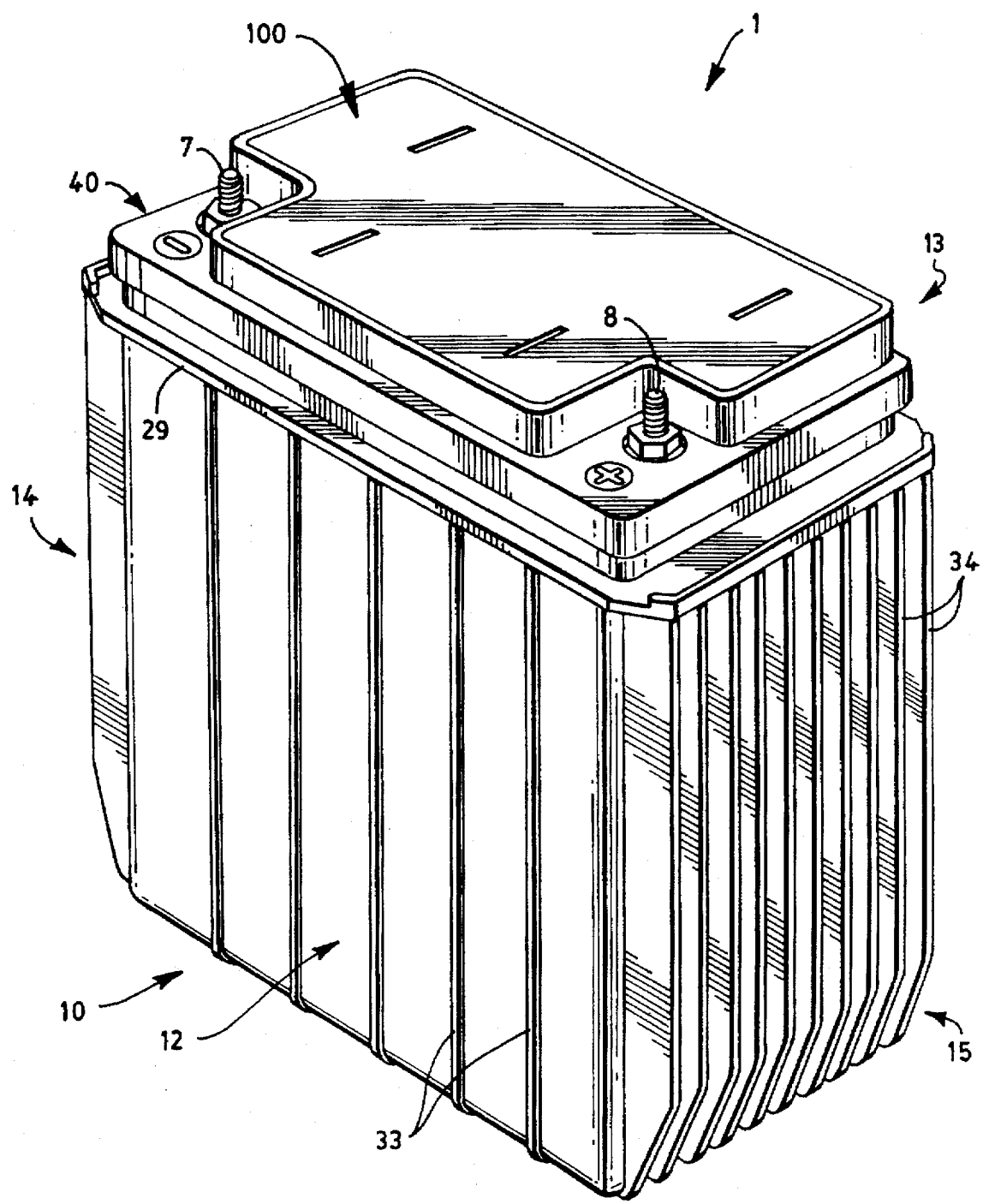
FIG. 3 is a perspective view of a stress resistant battery configuration in accordance with the present invention.

FIG. 3 illustrates the preferred embodiment of the present invention for a stress resistant battery configuration 1. In its broadest overall aspects, the battery of the present invention comprises a novel reinforcement and structural design which allows the battery casing to be manufactured out of light weight materials, such as, solvent resistant and resilient plastics, polypropylene or polystyrene as for example.

External reinforcements strengthen and add structural rigidity to the battery casing while internal reinforcements help insulate the battery's internal components from vibrational stress. FIG. 3 shows the fully assembled and novel casing, cover assembly and valve cover of the present invention including external reinforcements such as ribbed reinforcements 34 in each endwall 14, 15 which provide for a stronger, reinforced battery casing.

Exemplary embodiments of the present invention have improved protection against internal and external vibrational stresses through a novel cover assembly design comprising a plurality of projections and baffles which extend into the bottom casing to form a structural connection with the plate groups. Notwithstanding vibrational stress, the positive and negative plates are substantially maintained in their electrically isolated locations without making contact. The novel internal and external structural reinforcement design of the present invention allows for the packaging of a greater number of plates per electrochemical cell, as well as, increases the durability and long term performance of the battery.

The present invention for a stress resistant battery configuration is further illustrated by the following non-limiting embodiments. With reference to FIG. 3 et seq. of the drawing which illustrate the embodiments of the present invention, like numerals will be used throughout where applicable.

FIG. 3 shows a fully assembled stress resistant battery 1 of the present invention having negative and positive terminal posts 7, 8 respectively. In the preferred embodiment, terminal posts 7,8 are threaded to accept a retaining nut. As known in the art, terminal posts 7, 8 may not be threaded to accept a connector means.

Figure 4:
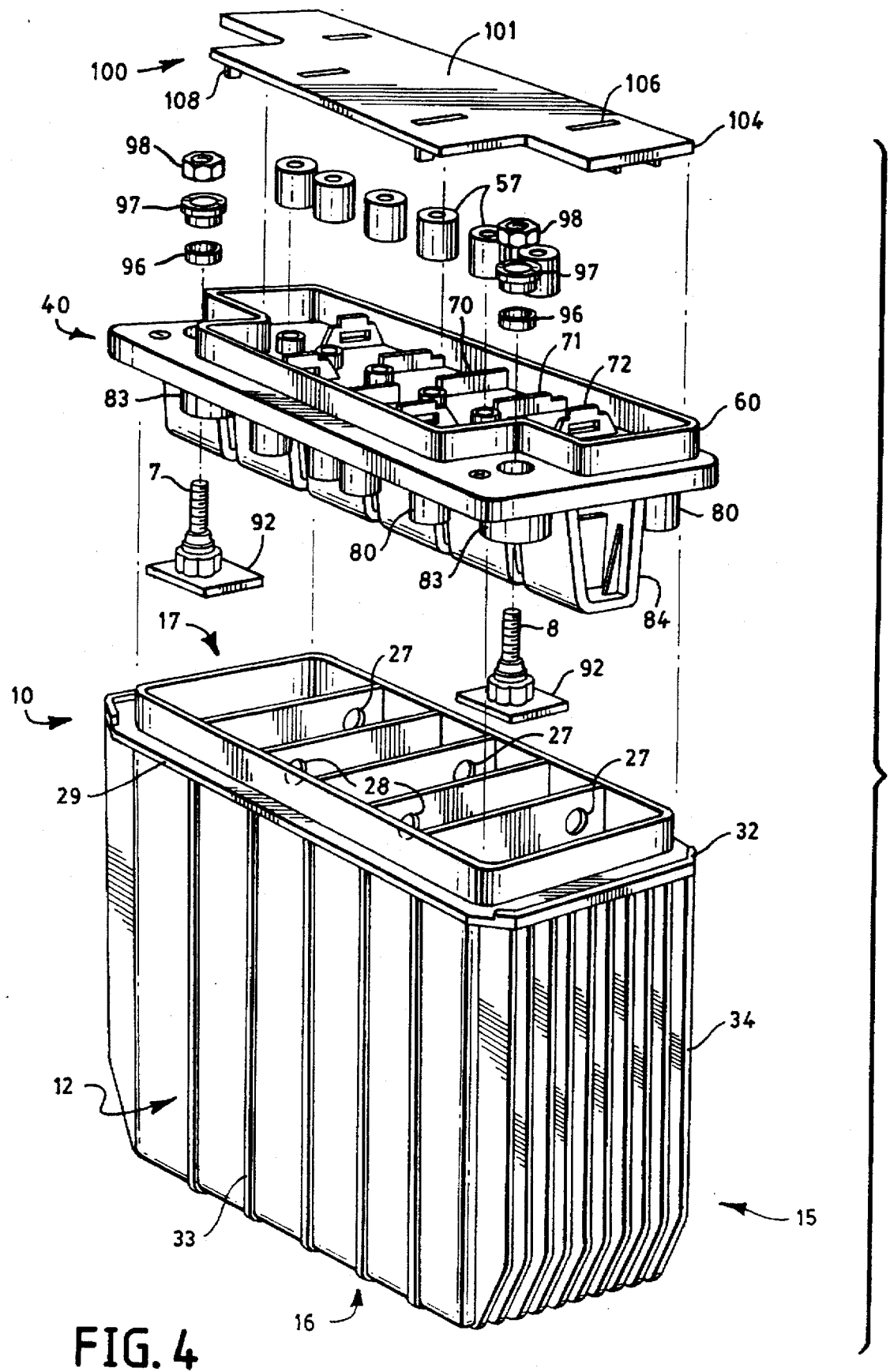
FIG. 4 is an exploded perspective view of a battery case, cover assembly and valve cover in accordance with the present invention.

FIG. 4 shows the preferred embodiment of the present invention for a stress resistant battery configuration comprises three basic components: a bottom casing 10, a cover assembly 40 and a valve cover 100. Valve cover 100 is designed to snap fit into cover assembly 40 which in turn is heat sealed to bottom casing 10. As known in the art, other embodiments for the present invention exist where the valve cover is cast with the cover assembly as an integral piece.

Figure 5:
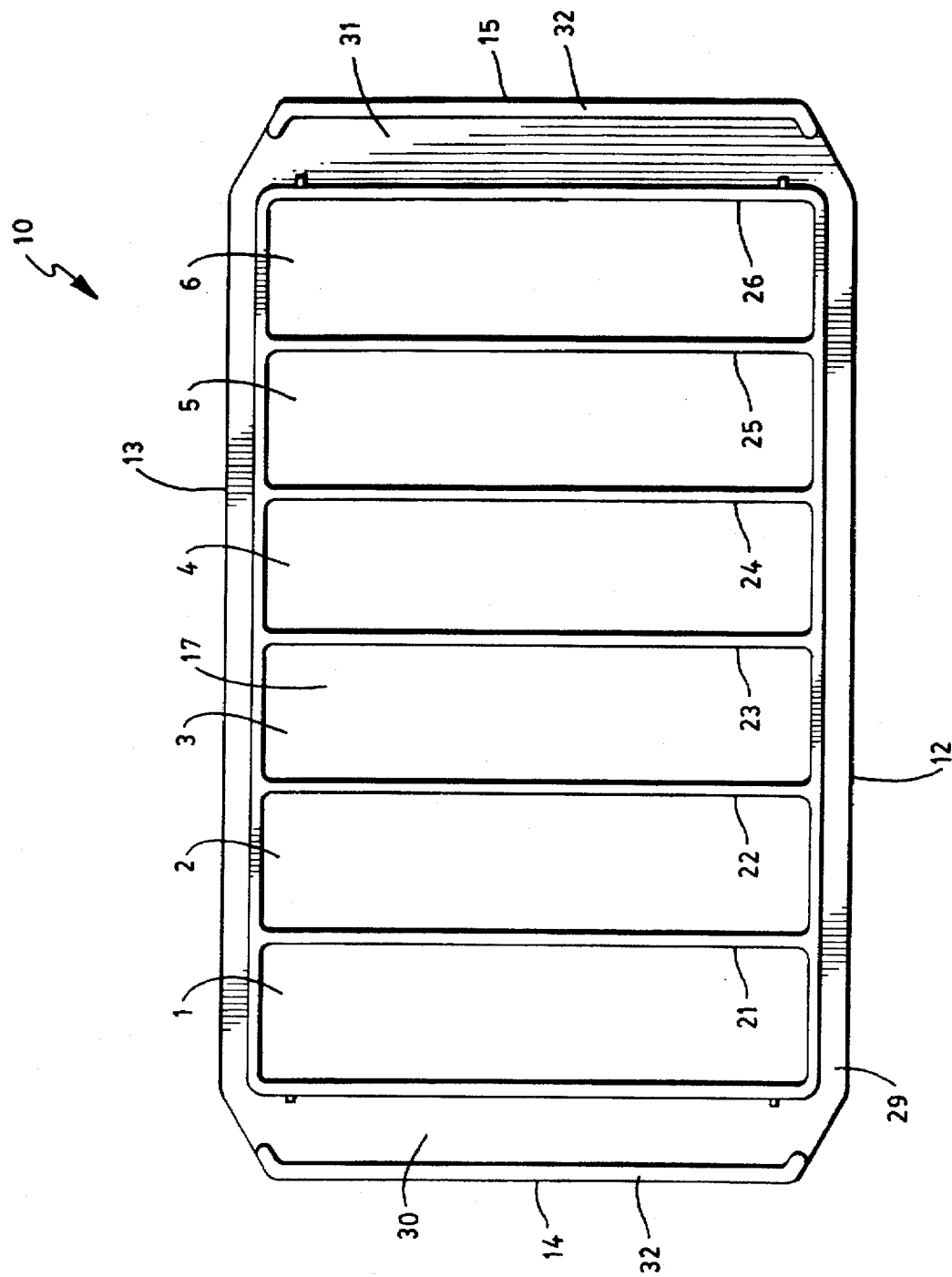
FIG. 5 is a top plan view of a bottom case in accordance with the present invention.

FIGS. 4 and 5 further show how bottom casing 10 is a substantially rectangular container with an open top comprising a front wall 12, a back wall 13, left and right endwalls 14, 15 and a bottom wall 16. Bottom casing 10 has an interior opening 17 that is partitioned into six compartments 1–6 by five cell separators 21–25 which are integrally molded into bottom casing 10. Holes 27 are punched through cell separators 21, 23, 25 in an upper location substantially to close to back wall 13. Holes 28 are punched in interior compartment walls 22 and 24 in upper locations substantially close to front wall 12. As known in the art, alternating the locations of holes 27 and 28 in this rearward and forward sequence allows for each electrochemical cell to be connected electrically in series.

With further reference to FIG. 3, at least one reinforcement 33 extends from each region near each adjoining cell. Preferably, reinforcements 33 are integrally cast in the same transverse plane as that of each separator wall 21–25 on both front and rear walls 12, 13.

Several closely spaced ribbed reinforcement supports 34 are located on left and right endwalls 14, 15 which add torsional resistance and help prevent stress crack formations. Ribbed reinforcement supports 34 significantly stiffen battery case 1 so that a greater amount of compressive force can be applied to the plates. Preferably, rib reinforcements 34 extend to about 0.5 inch or greater in length. It is also generally preferred to have reinforcements 33 and 34 molded as an integral part of the casing, but they may be molded separately and bonded to the casing, by any suitable means known in the art.

FIG. 3, for example, shows how reinforcements 33 and ribbed reinforcements 34 terminate in ledge 29 which substantially surrounds the upper perimeter defined by interior opening 17 of bottom casing 10. FIG. 5 shows how left and right sided portions 30, 31 of ledge 29 have a raised lip 32 which functions as a hold down clamp as known in the art. Depending on the placement of battery 1, raised lips 32 could be placed on the portion of ledge 29 which are adjacent to the front and rear walls 12, 13 respectively.

FIG. 3 shows how the density of ribs 34 on right endwall 15 are in much greater proportion than the density of reinforcements 33 on front wall 12. The same ratio applies with respect to reinforcements 33 on rear wall 13. By symmetry, the same ratio applies to the relationship between ribs 34 of left endwall 14 to reinforcements 33 on either front or rear walls 12, 13. Alternatively, other suitable reinforcements in the form of other configurations, such as, ramped shaped or u-shaped configurations could be used in place of reinforcements 33 and ribbed reinforcements 34 which also provide vibrational resistance.

Figure 6:
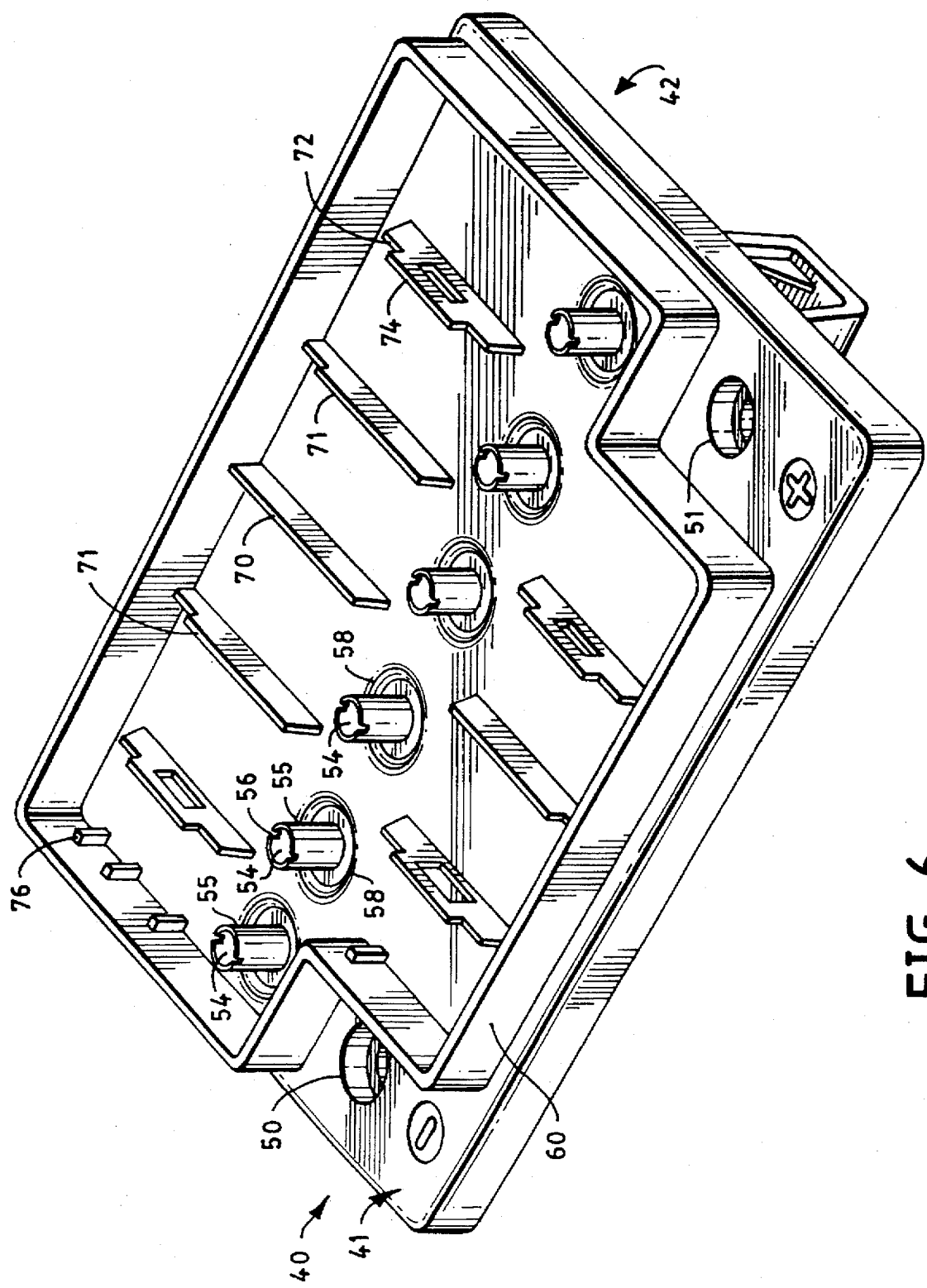
FIG. 6 is a top perspective view of a cover assembly in accordance with the present invention.

FIGS. 6 and 7A illustrate how molded cover assembly 40 of the present invention comprises a substantially planar top surface 41, a substantially planar bottom surface 42, adjoined by a perimeter wall 43 which extends beyond bottom surface 42 to form a perimeter lid 44. Perimeter wall 43 has a substantially rectangular contour comprising front and rear perimeter walls 44, 45, and, left and right side perimeter walls 46, 47 respectively.

With further reference to FIGS. 6 and 7A, cover assembly 40 has two terminal bores 50, 51 juxtaposed at the left and right front corners of top surface 41 which extend through to bottom surface 42. Terminal bores 50, 51 are molded to the shape of the battery terminals posts 7,8 which extend therethrough. In one embodiment of the present invention which is explained in more detail below, terminal bores 50, 51 comprise a plurality of concentric shapes to fit the configuration of the battery terminal posts 7,8. Terminal bore 50 provides an opening for the negative terminal post 7 and terminal bore 51 provides an opening for the positive terminal post 8.

FIGS. 6 and 7A show how six substantially circular bores 54 each having a substantially cylindrical raised portion 55, are located in six substantially equidistant locations across top surface 42, approximately midway with respect to the transverse plane. FIGS. 6 and 7A show how for a specific embodiment of the present invention raised portions 55 are notched at locations 56 to provide a fail safe vent path. Each raised portion 55 is surrounded by a well 58.

Figure 8A:
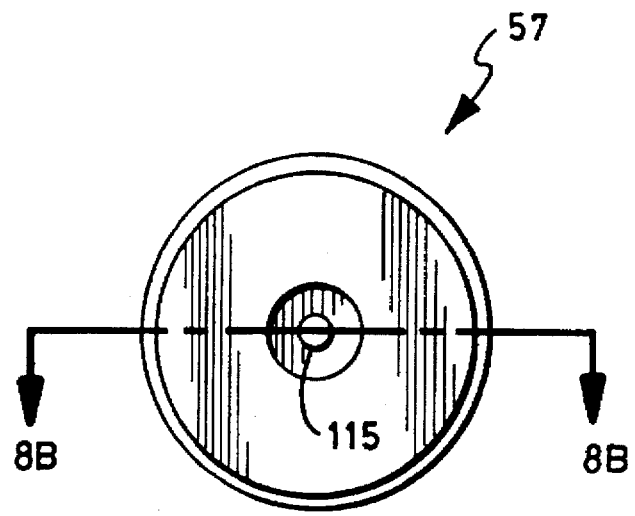
FIG. 8A is a top plan view of a valve in accordance with the present invention.
Figure 8B:
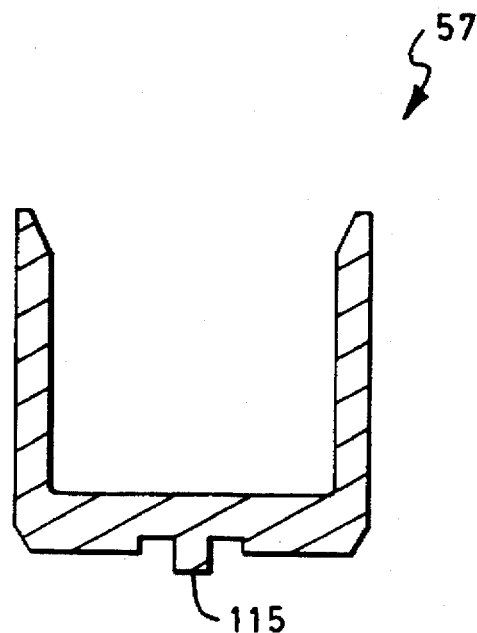
FIG. 8B is a sectioned view of a valve taken along lines 8B—8B of FIG. 8A in accordance with the present invention.
Figure 14:
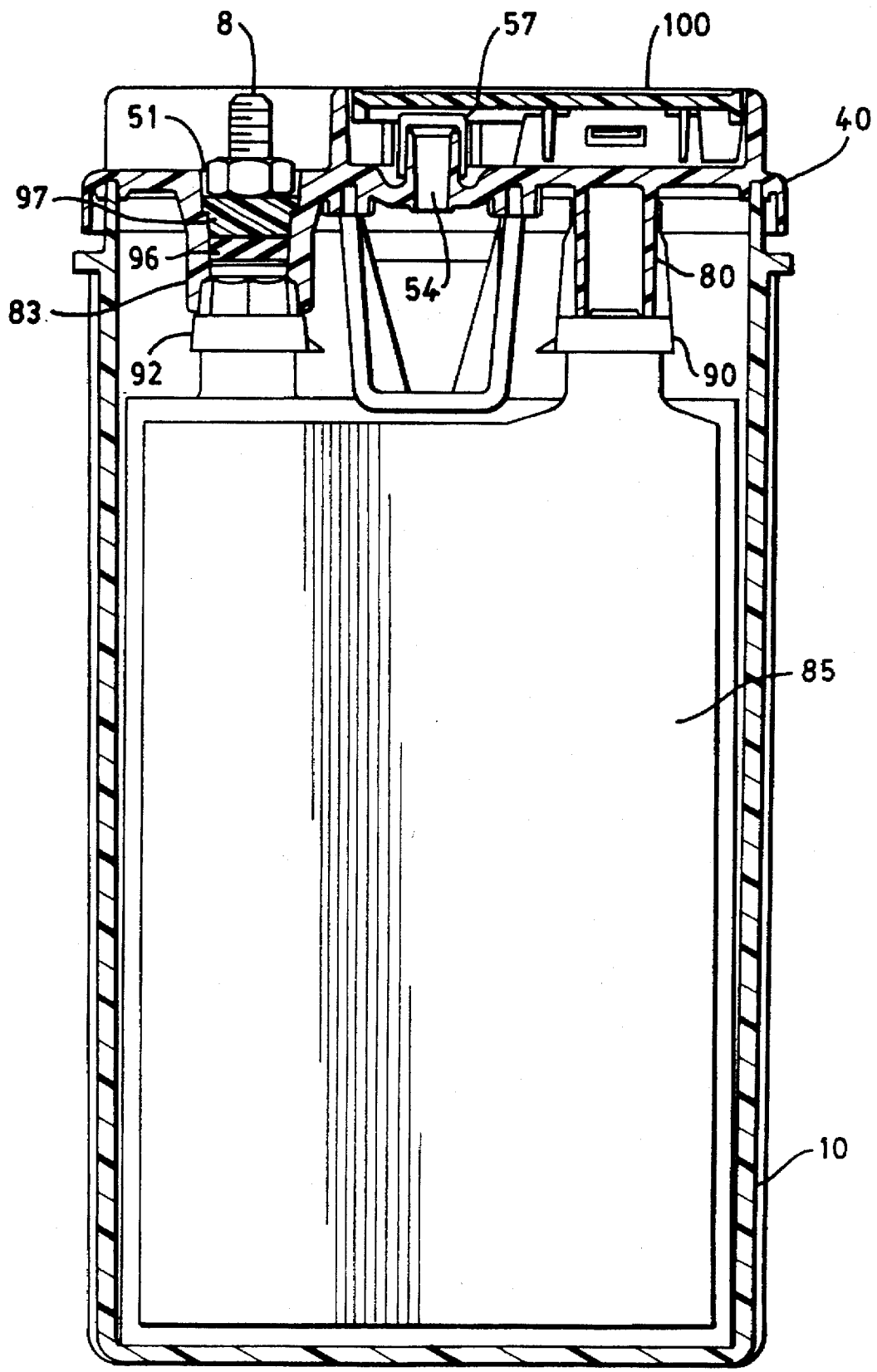
FIG. 14 is a side sectional view taken along 14—14 of FIG. 7C of a stress resistant battery configuration in accordance with the present invention.

FIGS. 4, 7B and 14, for example, show how in the preferred embodiment of the present invention, valves 57 press fit over raised portions 55 and are held in a vertical interference fit by valve cover 100. Valves 57 may alternatively be screwed into threaded portions or retained in place by any suitable locking means known in the art, such as, a plug fit. FIGS. 8A and 8B show the preferred embodiment of valve 57 is a substantially cup shaped configuration having a nippled extension 115. Valves 57 are preferably made of a rubber material, ethylene propylene diene monomer, for example.

As shown in FIGS. 7A, 7B and 7C, for the preferred embodiment of the present invention, top portion 41 of cover assembly 40 has a raised perimeter wall 60 comprising substantially rectilinear perimeter portions 61–68 as shown. Raised wall 60 encompasses the entire top portion 41 with the exception of two substantially rectangular regions which surround terminal bores 50, 51. The purpose of raised wall 60 is to serve as an insulation barrier which prevents leakage currents from making contact with either terminal 7,8. In addition, raised wall 60 serves as a dam that can contain electrolyte which may leak from with interior 17 of casing 10 during heavy vibrational stress conditions. In other embodiments of the present invention where valve cover 100 is integrally cast with cover assembly 40 as a single solid piece, raised wall 60 forms a contour of a mantle portion. As known in the art, when a one piece embodiment of this design is used, typically, valves 57 are adapted to screw into threaded circular bores, or in the alternative, press fit and held in place by a suitable cover strip.

Figure 9:
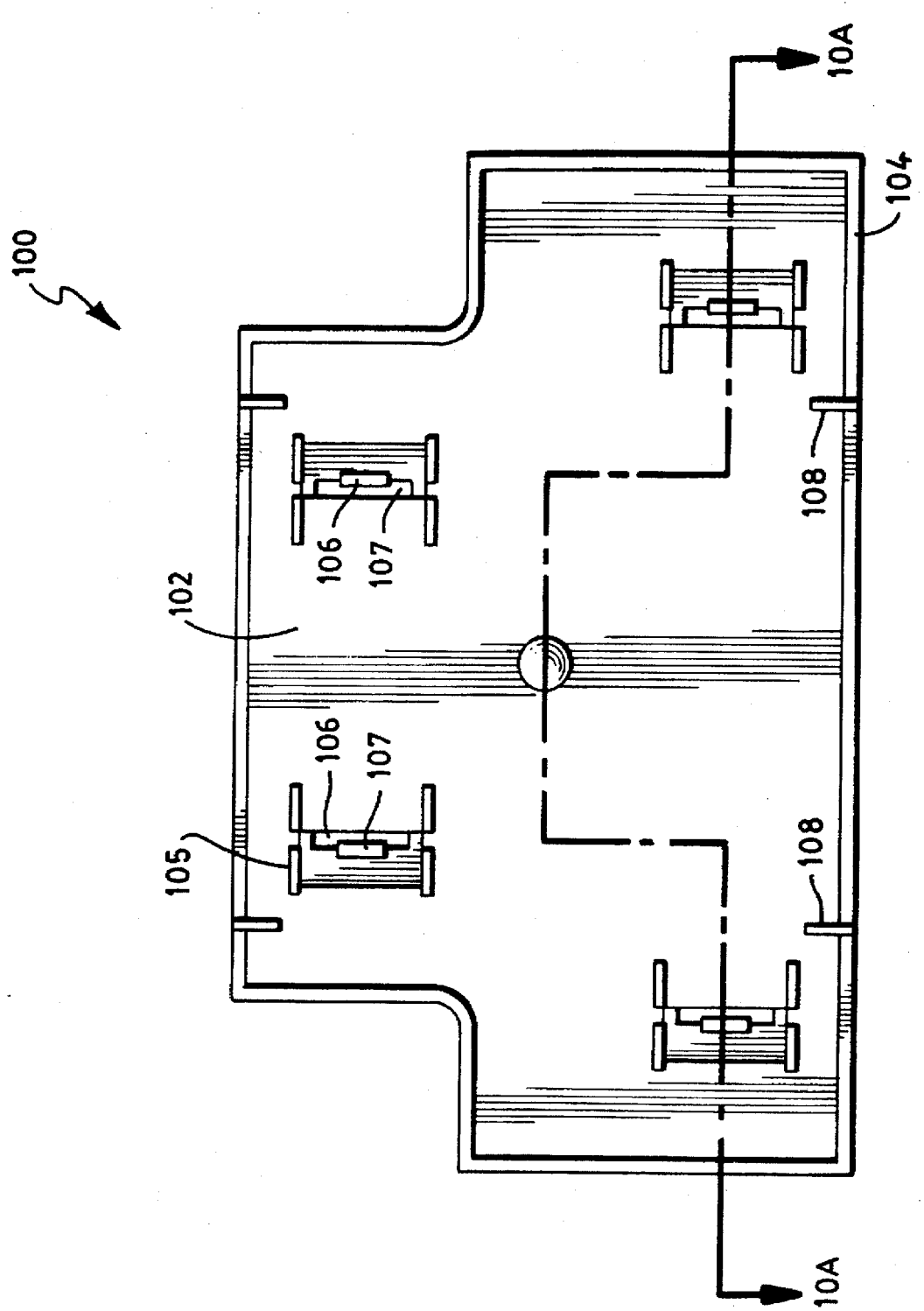
FIG. 9 is a plan view of the bottom of a valve cover in accordance with the present invention.
Figure 10A:
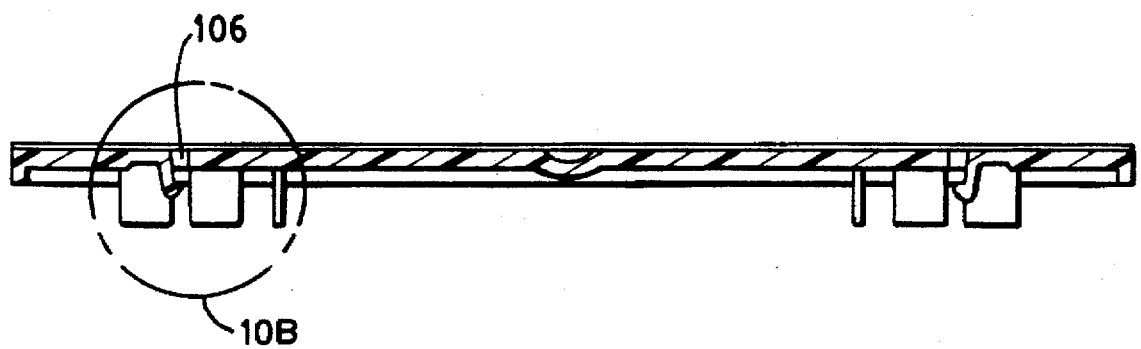
FIG. 10A is a sectional view taken along lines 10A—10A of FIG. 9 of a valve cover in accordance with the present invention.
Figure 10B:
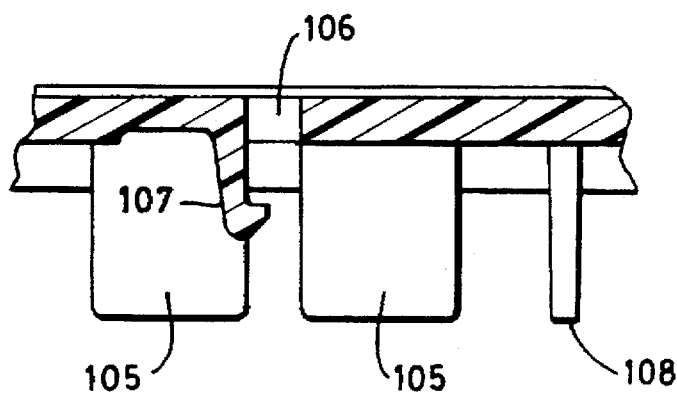
FIG. 10B is an expanded sectional view of taken around the encircled area 10B as shown in FIG. 10A in accordance with the present invention.

FIGS. 4, 7C, 9, 10A and 10B show how valve cover 100 comprising an upper surface 101 and a lower surface 102, is bound by a substantially rectilinear contour 103 so as to fit inside the contour of perimeter wall 60. FIG. 9 shows how bottom surface of valve cover 100 has a lip 104 that follows the perimeter 103 of valve cover 100. FIGS. 9, 10A and 10B show how a plurality of paired tabs 105 normal to bottom surface 102 are located perpendicularly with respect to slots 106. Locking tabs 107 normal to surface 102 are located adjacent to each slot 106. Tabs 108 attach to bottom surface 102 and lip 104 and are normal to bottom surface 102 in the transverse plane so as to prevent lateral displacement of valve cover 100.

FIGS. 6, 7A and 7B show how upper surface 41 of cover assembly 40 has a plurality of supportive and reinforcement structures located within the boundary of perimeter wall 60 which serve more than one function in accordance with the following description. Extending substantially midway in the transverse plane from perimeter portion 68, elongated support 70 functions to add torsional rigidity to cover assembly 40 and serve as a support for lip of valve cover 100. Stringer supports 71 are located on both sides and opposite of support 70 and adjoin perimeter portions 61 and 68. Stringer supports are notched at their adjoining ends to engage lip 104 and prevent valve cover 100 from shifting laterally. Stringer supports 71 contribute to the torsional rigidity of cover assembly 40 and directly support valve cover 100 over substantially the entire length of the stringer.

Extending on either side of supports 71, a plurality of locking supports 72 transversely located within the four corners of within perimeter wall 60 serve to support and snap fit valve cover 100 shut. FIG. 6 shows how an opening 73 in each locking support 72 is provided for the engagement by each tab hook 107 of valve cover 100. Each Horizontal locking support also has a riser portion 74 that extends into each transverse slot 106. Upon snap fitting valve cover 100 shut, riser portion 74 fits flush with upper surface 101 and serves as a planar lock to assist in preventing lateral shifting of valve cover 100. Double tabs 105 serve as a guide which aligns the risers 74 with slots 106 for efficient snap fit assembly of valve cover 100 to cover assembly 40, as well as assist in laterally engaging valve cover 100. A plurality of support columns 76 interiorly adjoin perimeter wall 60 and serve to support valve cover 100 along lip 104.

In other embodiments of the present invention the functions of various support structures may be combined in different variations of the above supportive reinforcement structures that are obvious to one skilled in the art. The aforementioned structures may also be located in different positions that those depicted in the drawing, such as, substantially longitudinal as opposed to transverse. For the embodiment in which the valve cover and cover assembly are cast as one piece, supporting structures may be substituted by a solid supporting section.

Although the figures depict substantially elongate and rectangular support structures, it is understood by those skilled in the art that such structures may be comprised of a variety of configurations, such as channels blocks, tubular beams, cylindrical posts may be used as suitable replacements. It is also understood that the above described support and locking structures may be relocated in a variety of positions and angles including longitudinally and diagonally. Double tabs 105 may relocated to engage other support structures other than horizontal locking supports.

Figure 11:
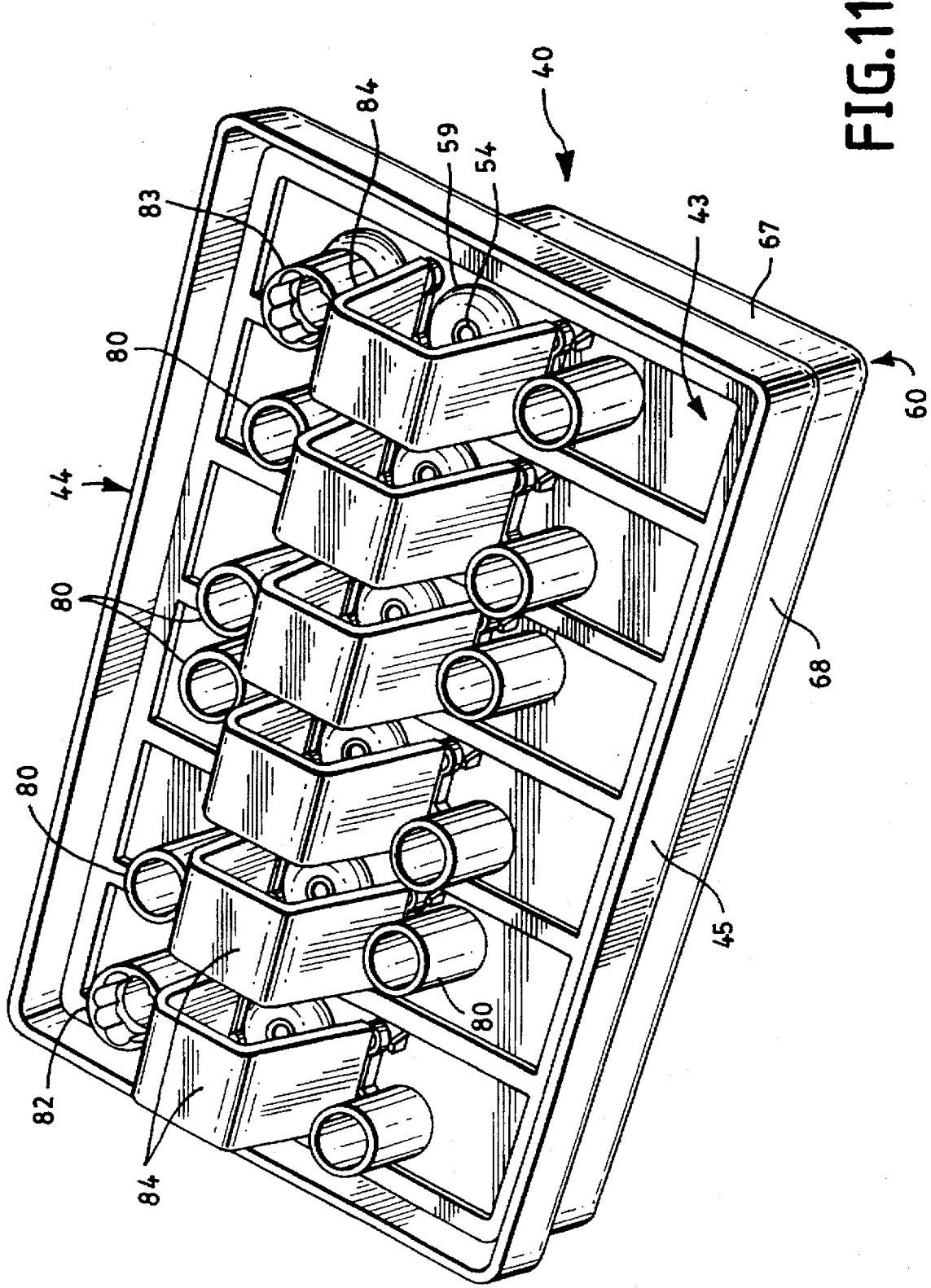
FIG. 11 is a perspective rear view of the bottom surface portion of a cover assembly in accordance with the present invention.
Figure 12:
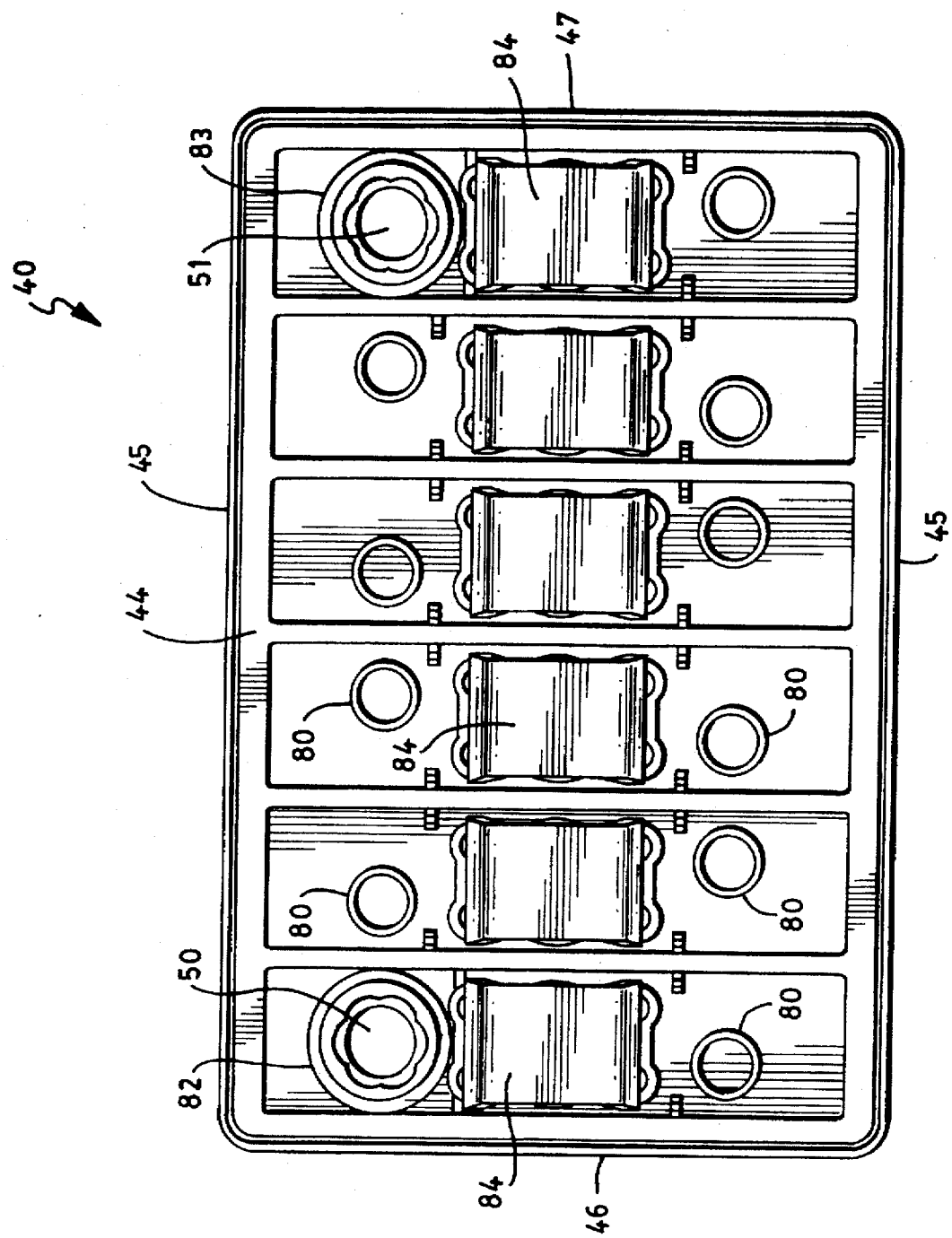
FIG. 12 is a bottom plan view of the bottom surface portion of a cover assembly in accordance with the present invention.

FIGS. 4, 11 and 12 illustrate bottom portion 43 of cover assembly 40, having ten substantially cylindrically shaped cover bosses 80 which extend from bottom portion 43, and two substantially cylindrically shaped terminal bosses 82, 83 which extend from terminal bores 50, 51. FIG. 12 illustrates how bottom portion 43 of cover assembly 40 can be divided into three rows of structural components which extend into bottom casing 10. With respect to the first row adjacent to front perimeter wall 45, there are two terminal bosses 82, 83 and four cover bosses 80; with respect to the middle or interior row, there are six baffles 84; and, with respect to the rear row adjacent to rear perimeter wall 45, there are six cover bosses 80. As shown in FIG. 12, baffle structures 84 are located at substantially equidistant locations as they are substantially centered under each cover bore 54.

Figure 13:
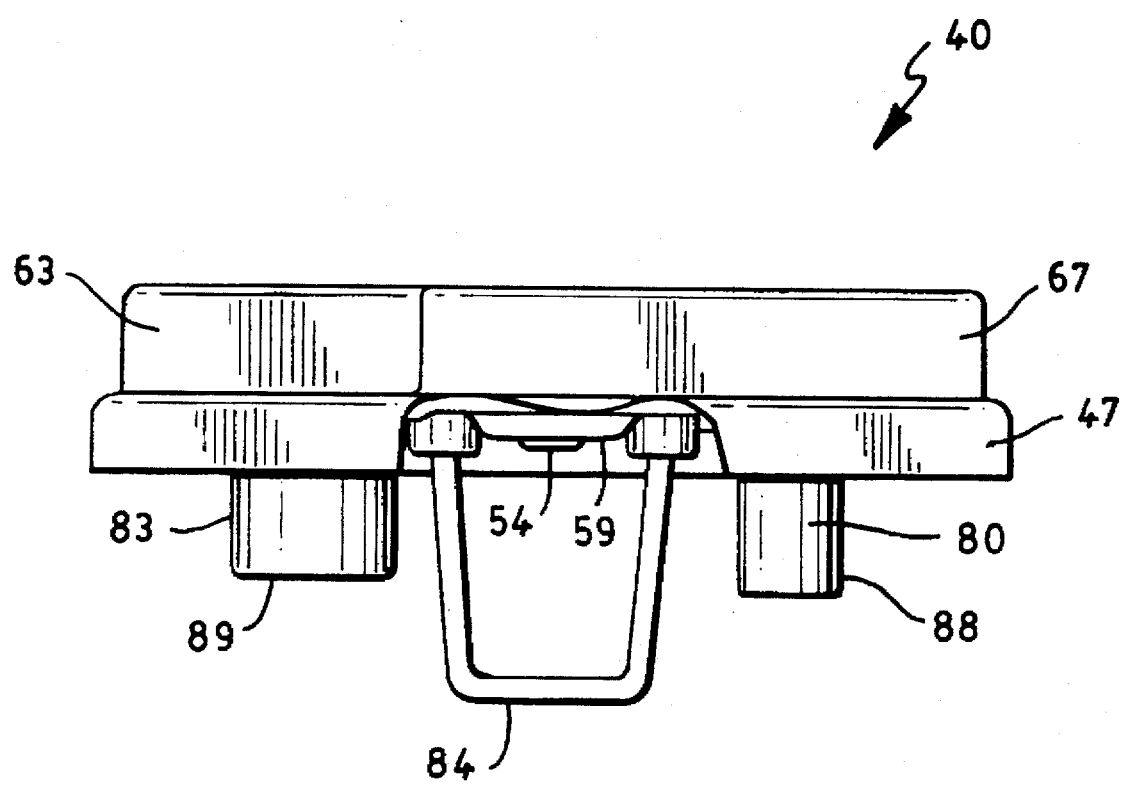
FIG. 13 is a side plan view shown in partial section of a cover assembly in accordance with the present invention.

FIGS. 11 and 13 show for a specific embodiment of the present invention each cylinder bore 54 extends through bottom surface 42 through a substantially hemispherical dome 59. Cover bosses 80 are located in staggered positions from left wall 46 to right wall 47. FIG. 11 shows how baffles 84 snap fit into bottom surface 43 at the locations centrally located with respect to front and rear perimeter walls 44, 45.

Preferably cover bosses 80 and terminal bosses 82, 83 are molded integrally with cover assembly 40, however, they may also be designed to snap fit or be glued into place. When cover assembly 40 is assembled to casing 10, cover bosses 80 and terminal bosses 82, 83 project vertically down into casing 10. Cover bosses 80 and terminal bosses 82, 83 may be of another functional or geometric shape, such as, substantially rectangular or circular or a combination of both.

FIG. 14 shows that one function of baffle 84 is to provide an interference fit between cover assembly 40 and plate groups generally indicated by 85. FIG. 14 also shows how positive terminal boss 83 forms an interference fit with positive terminal cast-on-strap 92 and cover boss 80 forms an interference fit with cast-on-strap 90, the details of which will be explained below.

Figure 15A:
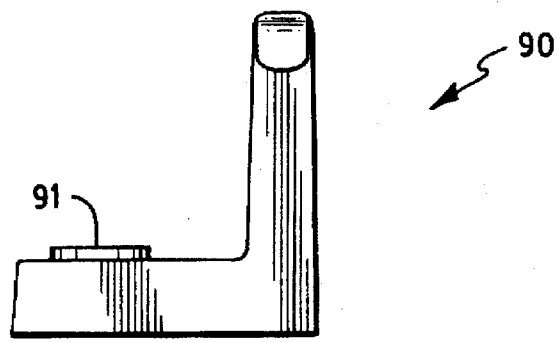
FIG. 15A is a side plan view of a cast-on-strap in accordance with the present invention.
Figure 15B:
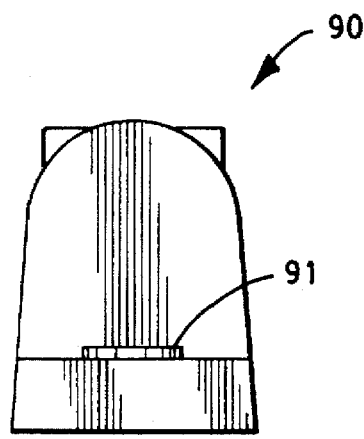
FIG. 15B is a front plan view of a cast-on-strap in accordance with the present invention.
Figure 15C:
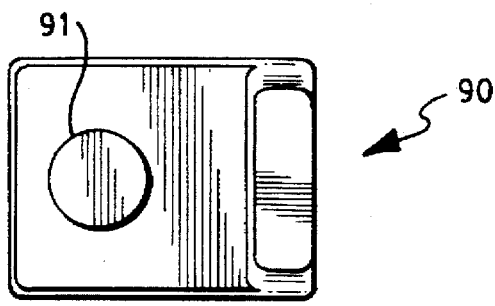
FIG. 15C is a top plan view of a cast-on-strap in accordance with the present invention.

FIGS. 15A, 15B and 15C show how in one embodiment of the present invention, each cast-on-strap 90 resembles the shape of a tombstone. However, cast-on-strap 90 may take on a variety of functional and geometric shapes including combinations thereof, such as, substantially rectangular. Cast-on-strap 90 includes a substantially circular seating boss 91 so as to structurally connect with each cover boss 80.

Figure 16:
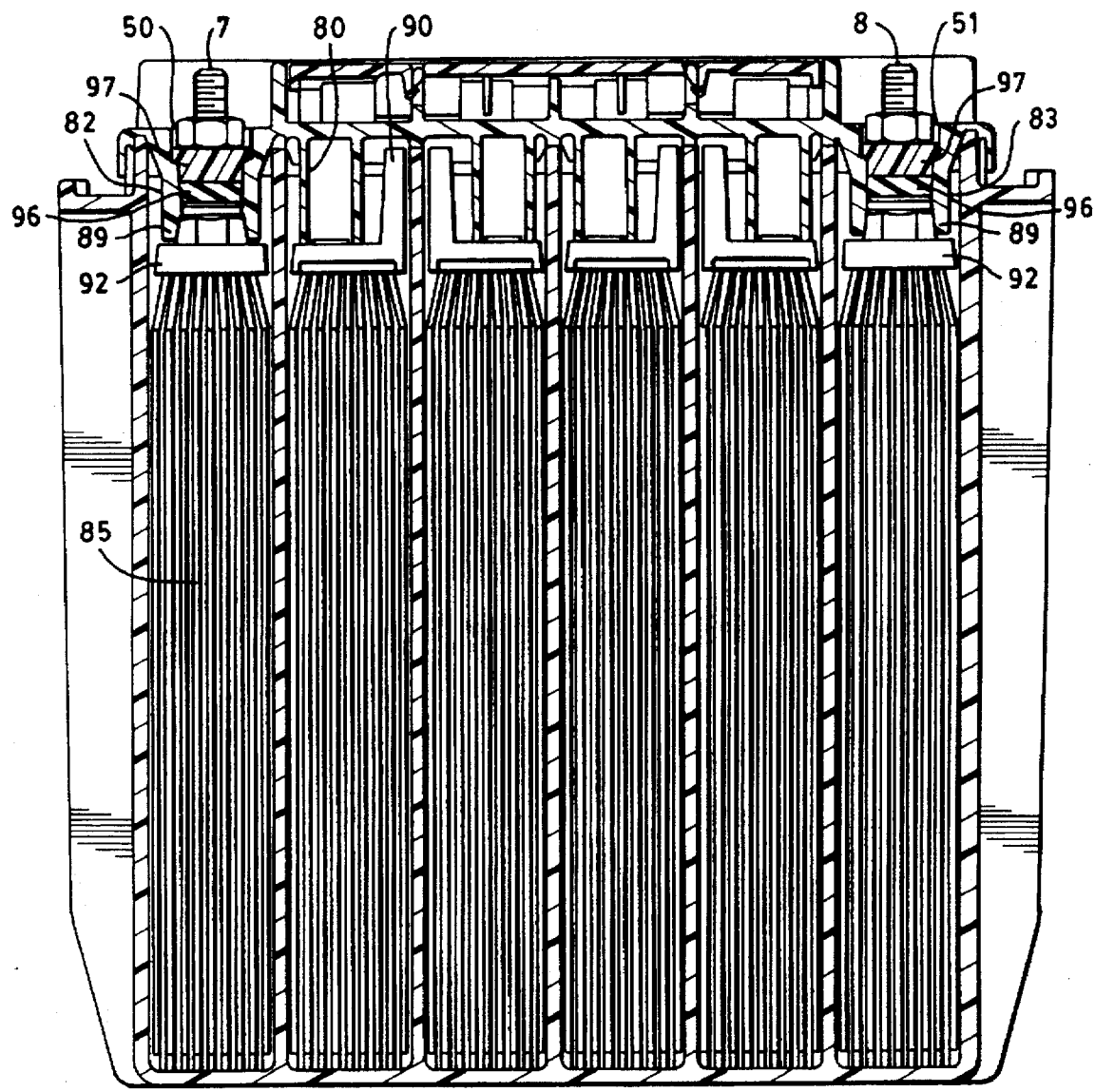
FIG. 16 is front sectioned view taken along 16—16 of FIG. 7C of the electrochemical cells connected by cast-on-straps in accordance with the present invention.

With further reference to FIG. 14, upon heat sealing of the cover assembly 40 to bottom casing 10, an interference fit between each cover boss 80 and each cast-on-strap 90 is made by softening lip portion 88 of cover boss 80 around seating boss 91 of cast-on-strap 90. Upon cooling and reforming, a rigid interference fit is complete. FIG. 16 in conjunction with FIG. 14 show how in a similar manner, an interference fit is made between lip portions 89 of positive and negative terminal bosses 82, 83 and terminal cast-on-straps 92. The interference fit provides extra rigidity to plate groups which increases resistance to mechanical stress.

Figure 17:
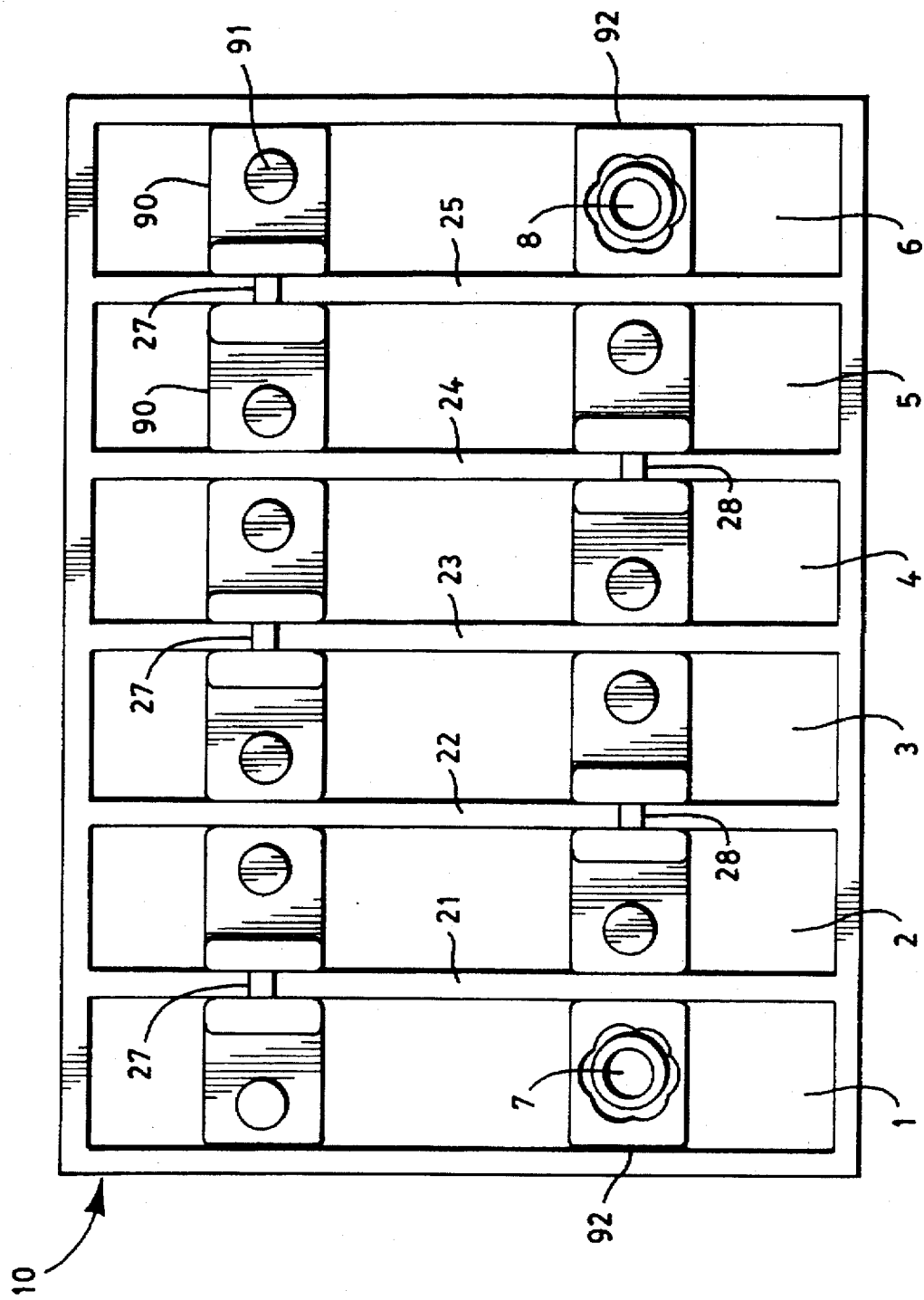
FIG. 17 is a top plan view diagrammatically showing the series connections between each 2 volt cell in accordance with the present invention.
Figure 18A:
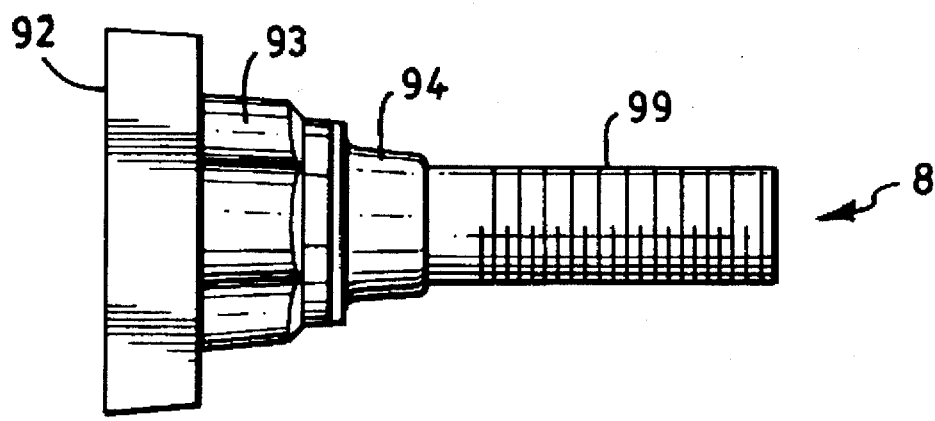
FIG. 18A is a side plan view of a terminal cast-on-strap in accordance with the present invention.
Figure 18B:
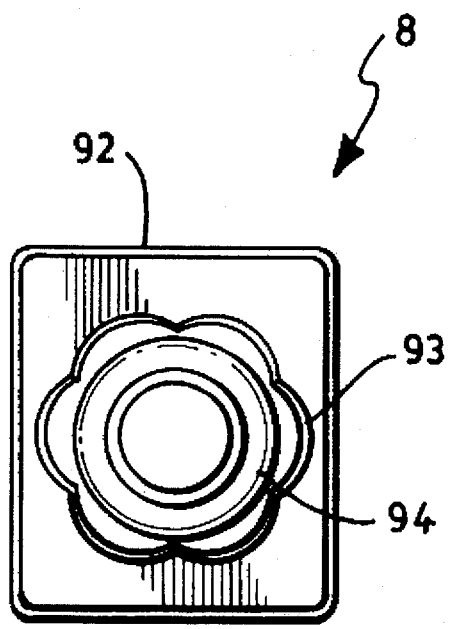
FIG. 18B is a top plan view of a terminal cast-on-strap in accordance with the present invention.

FIGS. 16 and 17 show how cast on straps 90 are welded back to back in pairs through punched holes 27, 28 which are alternatingly located in frontward and rearward positions in separator walls 21–25 of the casing 10. As known in the art for negative ground systems, electrochemical cells 1–6 are electrically connected in series beginning a zero volt potential at negative terminal post 7 and ending with a twelve volt potential at positive terminal post 8. In this way a series electrical connection from one electrochemical cell to another electrochemical cell is made aggregating to a 12 volt potential.

FIGS. 4, 18A, 18B, 19A and 19B taken in conjunction show how in the preferred embodiment of the present invention, terminal posts 7,8 each comprise a threaded portion 99, a tapered shank 94, a scalloped shaped head portion 93 and a platform 92. Thus, in the preferred embodiment, terminal posts 7,8 function like a special cast-on-strap 90, a terminal cast-on-strap, which contains a positive or negative plate group depending on its polarity. As known in the art, terminal posts do not make any internal series connections with other cast-on-strap members. This is because they are connected in series with an external load. Scalloped shaped head 93 is provided to prevent over-torquing during electromechanical connection of the battery wires to the positive and negative terminals respectively. With further reference to FIGS. 18 and 19, for example, this accomplished by the combination of the terminal bore of battery cover assembly and terminal post design in which the terminal bores 50, 51 are matched to the configuration of the terminal posts 7,8 which extend from platforms 92 so that the terminal posts and terminal bores fit like two pieces of a puzzle that lock together.

Positive and negative terminal posts 7,8 may have a multilobed shaped head 93 of other geometric configurations, such as substantially hexagonal, triangular or circular, including combinations and equivalents thereof. Multilobed shaped head 93 ensures that torque or turning forces are evenly distributed within the terminal bores 50, 51 of cover assembly 40 thereby minimizing internal stress loads.

FIGS. 14, 16, 19A and 19B show how hydrostatic pressure is used to seal terminal bore 51. A hydrostatic seal is accomplished by means of terminal post 8 having a platform portion 92 and a tapered shank 94, gasket 96, collar 97, retaining nut 98 and terminal bore 51. Upon final assembly of the battery case 1, gasket 96 followed by retainer 97 are placed over terminal post 8 and into the terminal bore 51. Retaining nut 98 is tightened over the threaded portion of terminal post 8 to compress gasket 96 and form a hydrostatic seal. The hydrostatic seal is accomplished by encapsulating the gasket in all dimensions as it is surrounded by terminal bore 51 on its cylindrical axis and bounded from below by platform 92 and bounded from above by retainer 97. Tapered shank 94 which is centered in terminal bore 51 ensures uniform compression throughout. When compressed, gasket 96 acts as a stiff fluid which can only be compressed so far. Thus through wear and use of the battery in applications, a hydrostatic seal prevents electrolyte from escaping via the terminal connections, a problem which plagues prior art battery construction. By symmetry, the above description of the hydrostatic seal applies to negative terminal 7 having terminal bore 50.

Figure 19B:
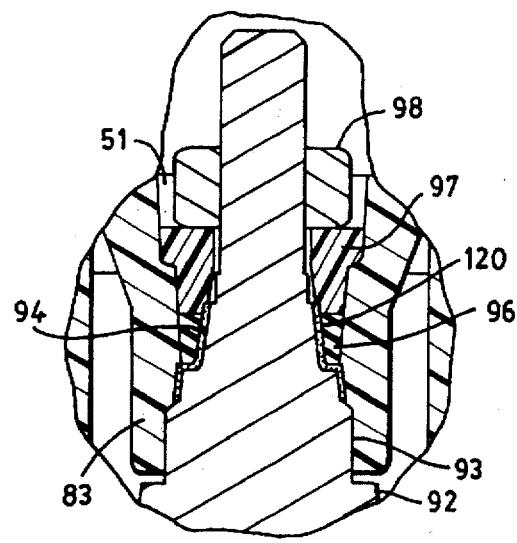
FIG. 19B is an expanded view of the of the encircled region 19B of FIG. 19A. Note, as with FIG. 19A, the terminal cast-on-strap is not shown in section so that the stippled region where the coating is applied can be highlighted.
Figure 19A:
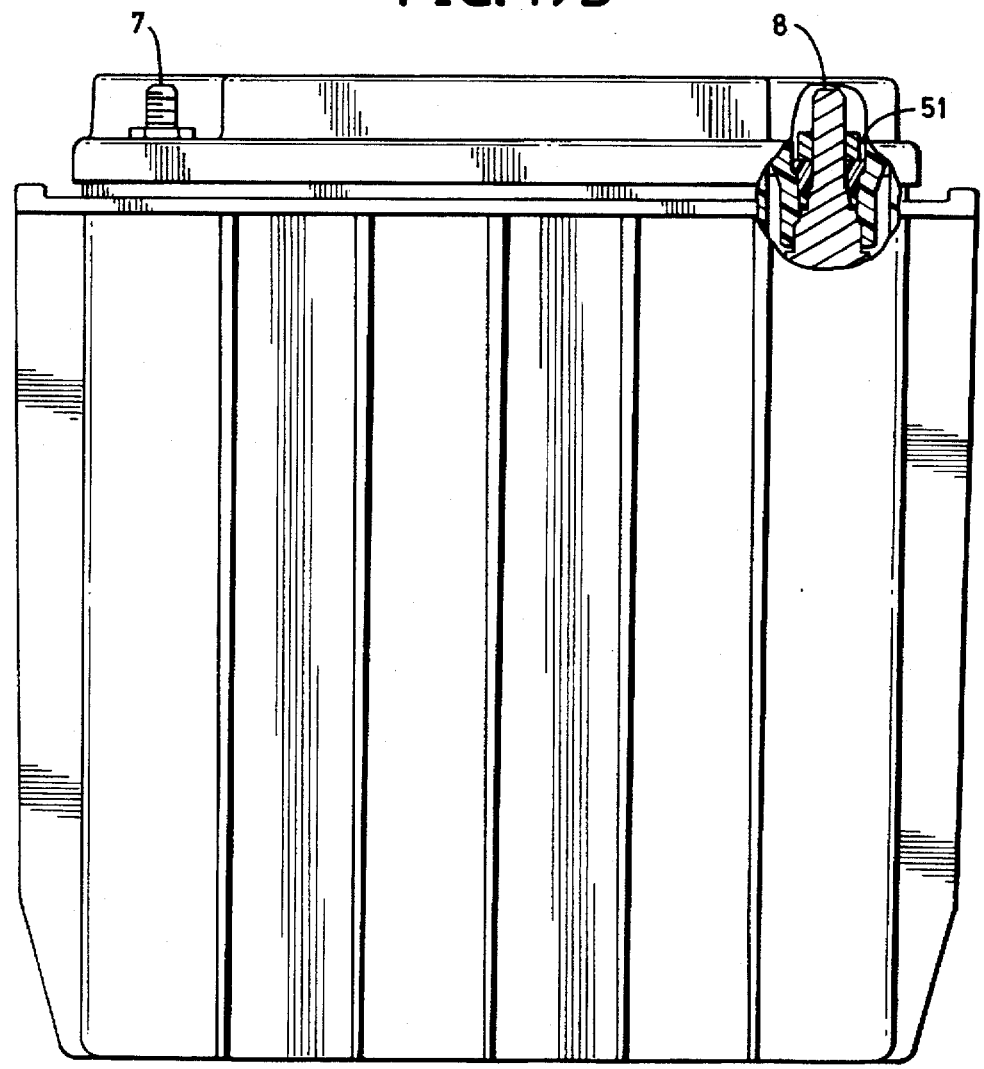
FIG. 19A is front and partially sectioned view of the positive terminal cast-on-strap fitted with a gasket, retainer and a hexagonal nut which form a hydrostatic seal in accordance with the present invention. Note that the section lines vary with respect to the retainer and gasket, and the terminal cast-on-strap.

FIGS. 19A and 19B show how additional protection against wear and tear of the terminal connections caused by stress relieving and creaping of the electrolyte, for example, is reduced by the application of protective coating 120 to terminal post 8. The protective coating highlighted with stipple can be any coating known in the art that is used to prevent metal to metal conduction, such as silicone. Examples of protective coatings applied are LOCTITE ULTRABLUE SILICONE 587, PERMATEX ULTRABLUE RTV SILICONE and CHEMLOK 487.

As stated heretofore, various structural components may take on a variety of functional and geometric shapes or combinations of both. Circular components and structural members may perform the same function with substantially a rectangular or trapezoidal shape. Cylindrical members may function equivalently with rectangular replacements.

In the foregoing specification, the invention has been described with reference to specific exemplary embodiments thereof. It will, however, be evident that various modifications and changes may be made thereunto without departing from the spirit and scope of the invention as set forth in the appended claims. The drawings and specification are, accordingly, to be regarded in an illustrative rather than in a restrictive sense.

What is claimed is:

1. A stress resistant battery comprising:

a casing having compartmental walls which partition a plurality of electrochemical cells each having a plurality of interleaved negative and positive plates;

a cover having a top portion, a bottom portion and a perimeter, said bottom portion being adapted to fit into said casing, said cover further comprising a plurality of cover bosses integral with and protruding from said bottom portion of said cover;

a plurality of baffles, said baffles being adapted to snap fit into said bottom portion of said cover so that when said cover is fitted to said casing an interference fit is made between said baffles and said electrochemical cells;

a plurality of cast on straps welded back to back in pairs through each of said compartmental walls forming an electrical connection in series from one electrochemical cell to another electrochemical cell, each of said cast on straps further including a seating boss connecting with each of said cover bosses;

a positive terminal connector having a substantially threaded elongate end and a platform attachment means on the other end, said platform attachment means welded to a positive plate group, said elongate end extending out of said cover to electrically connect to one side of a load;

a negative terminal connector having a substantially threaded elongate end and a platform attachment means on the other end, said platform attachment means welded to a negative plate group, said elongate end extending out of said cover to electrically connect to the other side of a load.

2. The battery of claim 1 wherein each of said cover bosses is softened and heat sealed over each of said seating bosses.

3. The battery of claim 2 wherein said cover is heat sealed to said casing.

4. The battery of claim 2 wherein the cover and casing consists of polypropylene.

5. The battery of claim 2 wherein said casing further comprises a bottom, a front wall, a rear wall and two end walls, said end walls having a plurality of rib reinforcements.

6. The battery of claim 2 further comprising means to affix each of the two terminal connectors, said means further comprising a scalloped configuration thereby preventing over-torquing and failure of the cover during electrical-mechanical connection.

7. A method of constructing a stress resistant battery, the method comprising:

providing a cover having an outer top portion, an inner bottom portion and a perimeter, a plurality of cover bosses integral with and vertically protruding from said inner bottom portion of said cover;

providing a plurality of baffles, said baffles being adapted to snap fit into said inner bottom portion of said cover;

providing a casing, said casing being partitioned into a plurality of electrochemical cells by a compartmental walls;

providing a plurality of separators;

providing a plurality of cast on straps, each of said cast on straps further including a seating boss;

welding said cast on straps back to back in pairs through each of said electrochemical cell walls to form an electrical connection from one electrochemical cell to another electrochemical cell;

fitting said bottom portion of said cover into said casing to press said baffles rigidly against said separators and fit said cover bosses over said seating bosses;

softening and reforming said cover bosses to said seating bosses so that said cover bosses closely fit around said seating bosses;

sealing said cover to said casing.

8. The method of claim 7 further providing a case having end walls having enough rib reinforcements so that the plates can be compressed without sacrificing structural integrity.

9. A stress resistant battery comprising:

a substantially rectangular battery casing having a plurality of electrochemical cells partitioned by compartmental walls;

a cover assembly having a top portion, a bottom portion and a perimeter, said bottom portion being adapted to fit into said casing, said cover further comprising a plurality of extension means integral with and protruding from said bottom portion of said cover;

a plurality of cast on straps welded back to back in pairs through each of said compartmental walls forming an electrical connection in series from one electrochemical cell to another electrochemical cell, each of said cast on straps further including a seating boss connecting with each of said extension means;

a positive terminal connector having a substantially threaded elongate end and a platform attachment means on the other end, said platform attachment means welded to a positive plate group, said elongate end extending out of said cover to electrically connect to one side of a load;

a negative terminal connector having a substantially threaded elongate end and a platform attachment means on the other end, said platform attachment means welded to a negative plate group, said elongate end extending out of said cover to electrically connect to the other side of a load.

* * * * *